(12) United States Patent
Moisanen et al.

(10) Patent No.: US 10,251,119 B2
(45) Date of Patent: Apr. 2, 2019

(54) METHOD AND APPARATUS FOR HANDLING REJECT

(71) Applicant: MediaTek Singapore Pte. Ltd., Singapore (SG)

(72) Inventors: Matti Moisanen, Oulu (FI); Marko Niemi, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 80 days.

(21) Appl. No.: 15/416,248

(22) Filed: Jan. 26, 2017

(65) Prior Publication Data

US 2017/0215126 A1 Jul. 27, 2017

Related U.S. Application Data

(60) Provisional application No. 62/287,475, filed on Jan. 27, 2016.

(51) Int. Cl.

| *H04W 48/08* | (2009.01) |
| *H04W 8/18* | (2009.01) |
| *H04W 48/16* | (2009.01) |
| H04W 84/04 | (2009.01) |

(52) U.S. Cl.
CPC ........... *H04W 48/08* (2013.01); *H04W 8/183* (2013.01); *H04W 48/16* (2013.01); *H04W 84/042* (2013.01)

(58) Field of Classification Search
CPC ..... H04W 60/00; H04W 76/18; H04W 48/08; H04W 8/06; H04W 48/20; H04W 36/14; H04W 36/0038; H04W 12/12; H04W 24/04

See application file for complete search history.

(56) References Cited

U.S. PATENT DOCUMENTS

| 2005/0180764 A1* | 8/2005 | Koike | ................ G03G 21/1882 |
| | | | 399/12 |
| 2009/0313425 A1* | 12/2009 | Futa | .................... G06F 12/0246 |
| | | | 711/103 |
| 2009/0320100 A1* | 12/2009 | Kitazoe | ................. H04L 1/1607 |
| | | | 726/3 |
| 2012/0077456 A1* | 3/2012 | Tiwari | .................. H04W 48/16 |
| | | | 455/404.1 |
| 2013/0117401 A1* | 5/2013 | Kumar | ................... H04L 51/22 |
| | | | 709/207 |
| 2014/0068259 A1* | 3/2014 | Resch | ................. G06F 21/6272 |
| | | | 713/167 |

* cited by examiner

*Primary Examiner* — Fred A Casca
(74) *Attorney, Agent, or Firm* — Oblon, McClelland, Maier & Neustadt, L.L.P.

(57) ABSTRACT

Aspects of the disclosure provide a method for handling reject in wireless communication. The method includes receiving, at an electronic device, a reject message indicative of a forbidden resource of a service provider network to use by the electronic device for wireless communication, determining a reliability attribute of the reject message, storing the forbidden resource associated with the reliability attribute, and maintaining the stored forbidden resource based on the reliability attribute.

20 Claims, 2 Drawing Sheets

METHOD AND APPARATUS FOR HANDLING REJECT

INCORPORATION BY REFERENCE

This present disclosure claims the benefit of U.S. Provisional Application No. 62/287,475, "Improvement to handling of reject received from unreliable source" filed on Jan. 27, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a mobile device keeps track of forbidden resources to use for mobile communication. In an example, a mobile device keeps track of a list of forbidden tracking areas. For example, the mobile device is not allowed to initiate establishment of communication service from a cell belonging to one of the forbidden tracking areas.

SUMMARY

Aspects of the disclosure provide a method for handling reject in wireless communication. The method includes receiving, at an electronic device, a reject message indicative of a forbidden resource of a service provider network to use by the electronic device for wireless communication, determining a reliability attribute of the reject message, storing the forbidden resource associated with the reliability attribute, and maintaining the stored forbidden resource based on the reliability attribute.

To store the forbidden resource associated with the reliability attribute, in an embodiment, the method includes storing an indicator that indicates the reliability attribute with the forbidden resource. In another embodiment, the method includes storing the forbidden resource in a first list when the reliability attribute is reliable and storing the forbidden resource in a second list when the reliability attribute is unreliable. In another embodiment, the method includes storing the forbidden resource in a first memory device when the reliability attribute is reliable, and storing the forbidden resource in a second memory device when the reliability attribute is unreliable. For example, the method includes storing the forbidden resource in the first memory device that is a non-volatile memory device when the reliability attribute is reliable; and storing the forbidden resource in the second memory device that is a volatile memory device when the reliability attribute is unreliable.

According to an aspect of the disclosure, the forbidden resource includes at least one of a forbidden location area for general packet radio service (GPRS) services, a forbidden location area for non-GPRS service, a forbidden location area for roaming, a forbidden location area for regional provision of service, a forbidden tracking area for roaming, a forbidden tracking area for regional provision of service, and a forbidden public land mobile network (PLMN).

To determine the reliability attribute of the reject message, in an embodiment, the method includes determining the reject message to be reliable when the reject message is integrity protected and determining the reject message to be unreliable when the reject message is not integrity protected.

To maintain the stored forbidden resource based on the reliability attribute, in an embodiment, the method includes removing the forbidden resource from storage in response to at least one of an expiration of a timer, a power-off of the electronic device and a removal of a subscriber identify module when the reliability attribute is unreliable.

Aspects of the disclosure provide an apparatus that includes a transceiver circuit, one or more memory circuits, and a processing circuit. The transceiver circuit is configured to transmit wireless signals to request resources from a service provider network for wireless communication, and receive wireless signals that carry a reject message. The processing circuit is configured to determine a reliability attribute of the reject message, control the one or two memory circuits to store the forbidden resource associated with the reliability attribute, and maintain the stored forbidden resource based on the reliability attribute.

Aspects of the disclosure provide a non-transitory computer readable medium storing program instructions for causing a processor to execute operations for handling reject in an electronic device. The operations include receiving a reject message indicative of a forbidden resource of a service provider network to use by the electronic device for wireless communication, determining a reliability attribute of the reject message, storing the forbidden resource associated with the reliability attribute, and maintaining the stored forbidden resource based on the reliability attribute.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
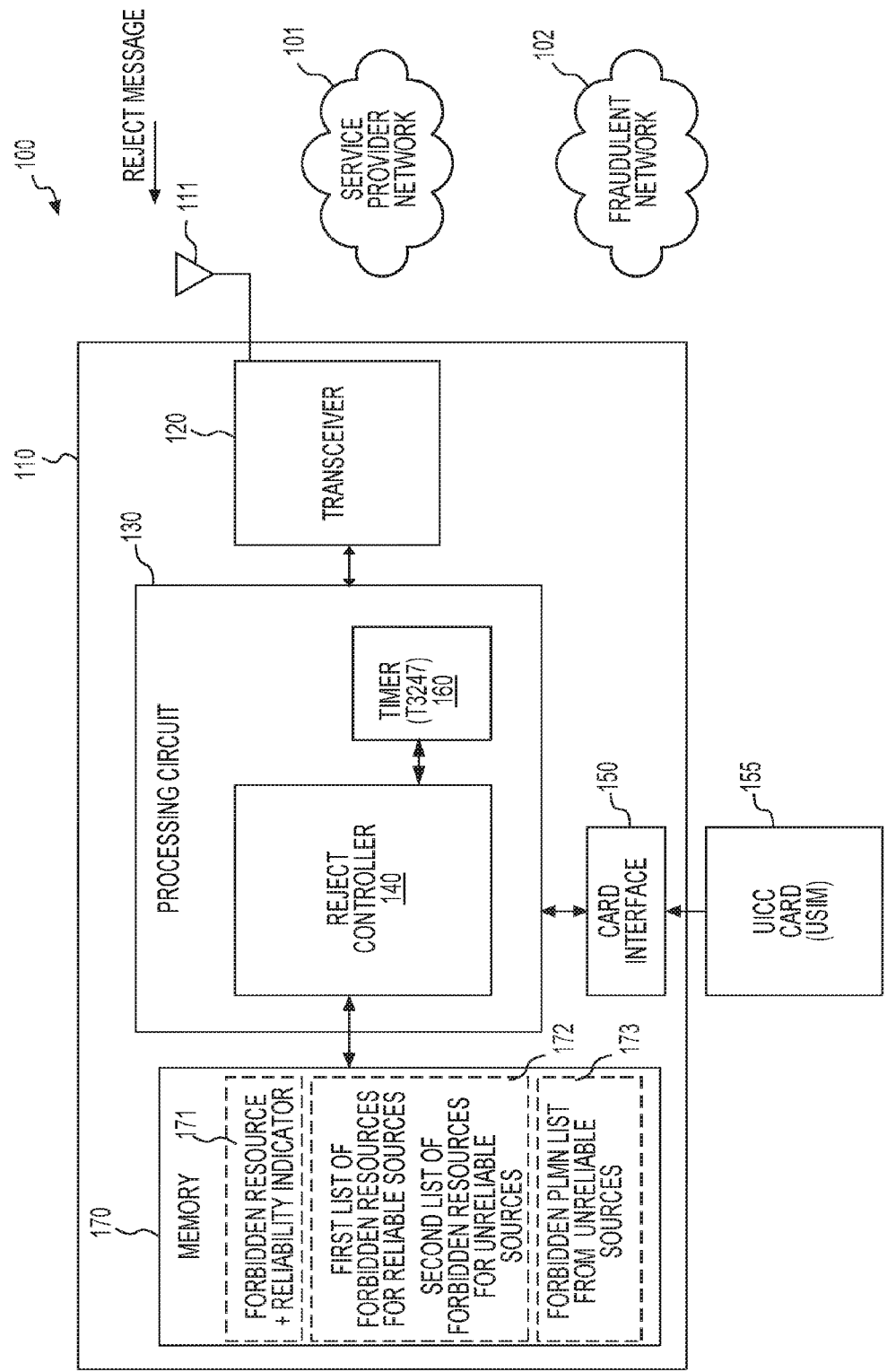
FIG. 1 shows a block diagram of a communication system 100 according to an embodiment of the disclosure.

FIG. 1 shows a block diagram of a communication system 100 according to an embodiment of the disclosure. The communication system 100 includes an electronic device 110 that requests resources from a service provider network 101 for wireless communication. The electronic device 110 may receive reject messages from the service provider network 101 that indicates forbidden resources for use by the electronic device 110 to conduct wireless communication. The electronic device 110 may also receive reject messages from a fraudulent network 102 that conducts attacks to the electronic device 110 using fake reject messages. The electronic device 110 is configured to determine reliabilities of the reject messages, store the forbidden resources associated with the reliabilities, and maintain the forbidden resources based on the reliabilities.

The service provider network 101 can include any suitable service provider, such as one or more mobile service providers, a wireless communication service provider, and the like. In an embodiment, the service provider network 101 includes a mobile service provider that can be implemented using any suitable mobile communication technology, such as third generation (3G) mobile network technology, fourth generation (4G) mobile network technology, fifth generation (5G) mobile network technology, global system for mobile communication (GSM), long-term evolution (LTE), and the like. It is noted that the service provider network 101 can include interconnections that are implemented using any suitable network technology, such wired, wireless, a cellular communication technology, a local area network (LAN), a wireless LAN (WLAN), a fiber optical network, a wide area network (WAN), a peer-to-peer network, the Internet, and the like.

In an example, a mobile service provider in the service provider network 101 is a facility-based provider that owns a mobile infrastructure (including both hardware and software), such as cell towers, network components that form a backbone to manage and control the services provided by the mobile service provider. In another example, a mobile service provider in the service provider network 101 is a mobile virtual network operator that does not own a mobile infrastructure, but leases telephone and data service from facility-based providers.

In an embodiment, the service provider network 101 can include any suitable public land mobile network (PLMN) for providing land mobile telecommunication services to the public. In an example, the service provider network 101 includes a home public land mobile network (HPLMN) for the electronic device 110. The electronic device 110 subscribes service from HPLMN, for example via a subscriber identity module (SIM), and the HPLMN holds a subscriber profile of the electronic device 110. The service provider network 101 can include other PLMNs. In an example, the electronic device 110 loses coverage of the HPLMN, and the electronic device 110 can search for another public land mobile network (PLMN) for roaming service. In an example, when the electronic device 110 roams to another PLMN, the other PLMN can receive the subscriber profile of the electronic device HO from the HPLMN.

According to an aspect of the disclosure, the electronic device 110 can send a request (e.g., a tracking area update request, a routing area update, a service request, a location update request, etc.) to the service provider network 101 to request resources from the service provider network 101 for wireless communication. The electronic device 110 may receive a reject message, such as an attach reject message, a tracking area update reject message, a service reject message, a location updating reject message, a routing updating reject message, and the like, from the service provider network 101 due to various reasons, such as no suitable cells, roaming not allowed, tracking area not allowed, and the like. In an embodiment, the reject message includes a cause value that indicates the reason and the forbidden resource of the service provider network 101 for use by the electronic device 110.

In an example, the electronic device 110 loses the coverage by the HPLMN, and the electronic device 110 tries to search for another PLMN for roaming service. The electronic device 110 may receive a location updating reject message with a cause value 11 from the service provider network 101. In the example, the location updating reject message with the cause value 11 indicates that the PLMN is not allowed to the electronic device 110. The electronic device 110 may need to search other PLMNs.

In another example, the electronic device 110 may receive a location updating reject message with a cause value 12. The location updating reject message with the cause value 12 indicates that the location area is not allowed for regional provision of service.

In another example, the electronic device 110 may receive a location updating reject message with a cause value 13.

The location updating reject message with the cause value 13 indicates that the location area is not allowed for roaming service.

In another example, the electronic device 110 may receive a location updating reject message with a cause value 15. The location updating reject message with the cause value 15 indicates that there is no suitable cell in the location area.

In another example, the electronic device 110 may receive a location updating reject message with a cause value that is domain based. For example, the cause value 2 is used for circuit switch (CS) domain, and the cause value 7 is used for packet switch (PS) domain. For example, the electronic device 110 may receive a location updating reject message with a cause value 2. The location updating reject message with the cause value 2 indicates that the non-general packet radio service (GPRS) is not available. It is noted that the cause value 2 may not affect operation of GPRS service in the PS domain. In another example, the electronic device 110 may receive a routing area updating reject message with a cause value 7. The routing area updating reject message with the cause value 7 indicates that the GPRS is not available for the subscriber. It is noted that the cause value 7 may not affect operation of non-GPRS service in the CS domain.

It is noted that, in some examples, the electronic device 110 combines a cause value and other suitable information, such as ongoing procedure and the like, to determine the domain that is affected.

According to an aspect of the disclosure, the reject messages can be integrity protected or non-integrity protected. In an example, the electronic device 110 and the service provider network 101 perform a security mode control procedure during an attach procedure to establish secure exchange of non-access stratum (NAS) messages via NAS signals in LTE technology example. Before the establishment of the secure exchange of NAS messages for the NAS signals, the reject messages have no integrity protection. After successful completion of the security mode control procedure, NAS messages exchanged between the electronic device 110 and the service provider network 101 are sent integrity protected using security algorithms. In an example, at a transmitting side, the security algorithms are used to generate a hash of an original message and the hash is added in the final message to be sent to the recipient side. The recipient side can use the security algorithms to authenticate that the received message is sent by the transmitting side.

It is noted that, in a 3G technology example, the secure exchange of messages is handled in access stratum (AS). The AS can indicate to the NAS whether the secure exchange is activated, and thus the NAS can determine whether the message is reliable or not.

It is noted that authentication may not be possible in certain scenarios, for example when the service provider network 101 cannot access the HPLMN of the electronic device 110.

Additionally, the electronic device 110 may receive fake reject messages from the fraudulent network 102. In an example, the fraudulent network 102 includes malicious base station that uses the fake reject messages to conduct security attacks to the electronic device 110. The malicious base station may listen to messages sent by the service provider network 101 and form the fake reject messages accordingly. The fake reject messages are not integrity protected in an example.

The electronic device 110 can be any suitable electronic device. In an example, the electronic device 110 is a terminal device used by an end-user for mobile telecommunication, such as a cell phone, a smart phone, a tablet computer, and the like. In another example, the electronic device 110 is a stationary device, such as a desktop computer. In another example, the electronic device 110 is a machine type communication device, such as a wireless sensor, an Internet of things (IoT) device and the like.

According to an aspect of the disclosure, the electronic device 110 is configured to determine reliabilities of the reject messages. For example, the electronic device 110 determines whether the reject messages come from reliable sources that have accomplished a security mode control procedure with the electronic device 110. Then, the electronic device 100 stores the forbidden resources associated with the reliabilities, and maintain the stored forbidden resources based on the reliabilities. For example, the electronic device 100 can keep the information of forbidden resources associated with reliable sources, and discard the information of forbidden resources associated with unreliable sources in response to certain trigger events.

Specifically, in the FIG. 1 example, the electronic device 110 includes a transceiver 120, a processing circuit 130, a card interface 150, and a memory 170 coupled together as shown.

The transceiver 120 is configured to receive and transmit wireless signals. In an example, the transceiver 120 includes a receiving circuit (not shown) and a transmitting circuit (not shown). The receiving circuit is configured to generate electrical signals in response to captured electromagnetic waves by an antenna 111, process the electrical signals to extract digital streams from the electrical signals. In an example, the transmitting circuit is configured to receive digital streams, such as management frames, data frames, and the like from for example the processing circuit 130, generate radio frequency (RF) signals to carry the digital streams, and emit electromagnetic waves in the air via the antenna 111 to transmit wireless signals that carry the digital streams.

The card interface 150 is suitably configured to accept a smart card, such as a universal integrated circuit card (UICC) card 155 provided by a wireless telecommunication service provider, such as the HPLMN service provider, and couple the UICC card 155 with other components in the electronic device 110, such as the processing circuit 130. Generally, the UICC card 155 includes a processing circuit (e.g., central processing unit not shown) and a memory (not shown). Generally, the memory is a non-volatile memory, such as a flash memory, and the like on the UICC card 155, and can keep the stored information when the UICC card 155 is not electronically coupled to an electronic device, such as the electronic device 110. The memory stores various information corresponding to the wireless telecommunication service provider, such as instructions for a subscriber identity module (SIM) application, instructions for a universal subscriber identity module (USIM) application, international mobile subscriber identity (IMSI) and related security authentication and ciphering information, user data (e.g., address book), and the like. The memory can also store temporary information related to a local network, such as a list of PLMNs, wireless access technologies, carrier frequency information, and the like.

In an example, based on the information stored in the UICC card 155, the electronic device 110 is able to perform wireless communication with another electronic device (not shown) under the management of the service provider network 101. The service provider network 101 manages and controls the wireless communication between the electronic device 110 and the other device. For example, the service provider network 101 determines paths for the wireless communication and allocates resources to enable the wireless communication. In another example, the service provider network 101 can forbid the electronic device 110 to use certain resources, and send reject messages to the electronic device 110 to indicate the forbidden resources.

The processing circuit 130 includes suitable circuits to perform various baseband processing operations, such as voice signal processing, control operations for the electronic device 110, execution of applications, and the like. In the FIG. 1 example, the processing circuit 130 includes a reject controller 140 configured to manage reject messages. In an example, the reject controller 140 is implemented using circuits. In another example, the reject controller 140 is implemented as a processor executing software instructions.

According to an aspect of the disclosure, the reject controller 140 is configured to determine a reliability attribute of the reject message, for example whether the reject message comes from a reliable source. In an example, the reject controller 140 determines whether the reject message is integrity protected. When the reject message is integrity protected, the reject controller 140 can authenticate the reject message, and determines that the reject message comes from a reliable source. Thus, the reliability attribute of the reject message is reliable. When the reject message is not integrity protected, the reject controller 140 determines that the reject message comes from an unreliable source. Thus, the reliability attribute of the reject message is unreliable.

Further, in an embodiment, the reject controller 140 determines the forbidden resource from the reject message. In an example, the reject controller 140 is configured to determine the forbidden resource based on cause value in the reject message.

For example, the reject controller 140 determines that the forbidden resource is a forbidden location area that is not allowed for regional provision of service when the cause value is 12; the reject controller 140 determines that the forbidden resource is a forbidden location area that is not allowed for roaming service when the cause value is 13; the reject controller 140 determines that the forbidden resource is a forbidden location area that has not suitable cells when the cause value is 15; the reject controller 140 determines that the forbidden resource is a forbidden location area that is not allowed for non-GPRS services when the cause value is 2 (or 3 or 6).

According to an aspect of the disclosure, the electronic device 110 is configured to keep track of the forbidden resources, not to request the resources in the forbidden resources. For example, when the electronic device 110 is in a location area in the forbidden location areas for non-GPRS services, the electronic device 110 is configured not to initiate a mobility management procedure; and when the electronic device 110 is in a location area in the forbidden location areas for GPRS services, the electronic device 110 is configured not to initiate a GPRS mobility management procedure.

In an embodiment, the reject controller 140 is configured to control memory devices, such as the memory 170, the memory in the UICC card 155, and the like to store the forbidden resource associated with the reliability attribute, and then the reject controller 140 can handle the forbidden resource based on the reliability attribute.

In the FIG. 1 example, the memory 170 is configured to store the forbidden resource associated with the reliability attribute. The memory 170 can include any suitable memory devices, such as a static random access memory (SRAM), a dynamic random access memory (DRAM), a flash memory, and the like. In an example, the memory 170 is a volatile memory that loses the store the information when the electronic device 110 is powered off. In another example, the memory is non-volatile memory that can keep the stored information when the electronic device 110 is powered off.

According to an aspect of the disclosure, the reject controller 140 can control the memory 170 to store various forbidden resources by list. For example, the memory 170 stores a list of forbidden location areas for general packet radio service (GPRS) services, a list of forbidden location areas for non-GPRS services, a list of forbidden location areas for roaming, a list of forbidden location areas for regional provision of service, and the like.

In an embodiment, the reject controller 140 is configured to store a forbidden resource with a reliability indicator for the forbidden resource in the memory 170, as shown by 171. The reliability indicator can indicate the reliability attribute for the reject message (and the reject source). For example, the reject controller 140 controls the memory 170 to store forbidden resources in lists. A list of forbidden resources includes a plurality of entries. Each entry can store an identification of a forbidden resource, such as an identification of a location area, and the like, and a reliability indicator associated with the forbidden resource. The reliability indicator indicates the reliability attribute for the forbidden resource.

In the example, when the electronic device 110 receives a first reject message (e.g., a fake reject message) that is sent by the fraudulent network 102, the electronic device 110 detects that the first reject message is not integrity protected, thus the first reject message is unreliable. The reject controller 140 determines a first forbidden resource (e.g., fake forbidden resource) for example based on a cause code in the first reject message, and then stores the first forbidden resource with the reliability indicator to indicate the unreliable attribute in the list of forbidden resources.

In the example, when the electronic device 110 receives a second reject message (e.g., a genuine reject message) that is sent by a base station in the service provider network 101 that has established secure exchange of messages with the electronic device 110, the electronic device 110 detects that the second reject message is integrity protected, thus the second reject message has the reliable attribute. The reject controller 140 determines a second forbidden resource (e.g., genuine forbidden resource) for example based on a cause code in the second reject message, and then stores the second forbidden resource with the reliable attribute in the list of forbidden resources.

Then, the reject controller 140 handles the forbidden resources based on the reliabilities of the forbidden resources in response to trigger events, such as an expiration of a timer, a power-off of the electronic device 110, a removal of the UICC card 155, and the like. In an example, the processing circuit 140 includes a timer 160 (e.g., T3247 timer) to track a back-off time for forbidden resources. When the timer 160 expires, the reject controller 140 removes forbidden resources with unreliable attribute from the list of forbidden resources, and keeps forbidden resources with reliable attribute in the list of forbidden resources. For example, the reject controller 140 removes the first forbidden resource with the unreliable attribute from the list of forbidden resources, and keeps the second forbidden resource with the reliable attribute in the list of forbidden resources. Then, the electronic device 110 can again request the removed forbidden resources, such as the first forbidden resource and the like, that are previously in the list of forbidden resources and now are removed from the list of forbidden resources, and the electronic device 110 can continue not to request the forbidden resources, such as the second forbidden resource, that are still in the list of forbidden resources. In this manner, the electronic device 110 can alleviate the attacks by the fraudulent network 102, and can reduce unnecessary signaling load that may drain battery.

In another example, the memory 170 is a non-volatile memory. In the example, at a power-off of the electronic device 110, the electronic device 110 performs a power-off procedure. During the power-off procedure, the reject controller 140 removes forbidden resources with unreliable attribute from the list of forbidden resources, and keeps forbidden resources with reliable attribute in the list of forbidden resources. For example, the reject controller 140 removes the first forbidden resource with the unreliable attribute from the list of forbidden resources, and keeps the second forbidden resource with the reliable attribute in the list of forbidden resources.

In another example, when the UICC card is detached from the card interface 150, for example being removed from the card interface 150, the reject controller 140 removes forbidden resources with unreliable attribute from the list of forbidden resources, and keeps forbidden resources with reliable attribute in the list of forbidden resources. For example, the reject controller 140 removes the first forbidden resource with the unreliable attribute from the list of forbidden resources, and keeps the second forbidden resource with the reliable attribute in the list of forbidden resources.

In a related exemplary device, a list of forbidden resources that includes both fake forbidden resources and genuine forbidden resources is removed in response to the one or more trigger events, thus the related exemplary device later conducts additional signaling to re-determine the genuine forbidden resources.

In another embodiment, the reject controller 140 is configured to store forbidden resources to different lists based on respective reliability attributes. For example, the memory 170 stores a first list and a second list as shown by 172. The first list is configured to store forbidden resources of reliable attribute, and the second list is configured to store forbidden resources of unreliable attribute.

In the example, when the electronic device 110 receives a first reject message (e.g., a fake reject message) that is sent by the fraudulent network 102, the electronic device 110 detects that the first reject message is not integrity protected, thus the first reject message is unreliable. The reject controller 140 determines a first forbidden resource (e.g., fake forbidden resource) for example based on a cause code in the first reject message, and then stores the first forbidden resource in the second list.

In the example, when the electronic device 110 receives a second reject message (e.g., a genuine reject message) that is sent by a base station in the service provider network 101 that has established secure exchange of messages with the electronic device 110, the electronic device 110 detects that the second reject message is integrity protected, thus the second reject message has the reliable attribute. The reject controller 140 determines a second forbidden resource (e.g., genuine forbidden resource) for example based on a cause code in the second reject message, and then stores the second forbidden resource in the first list.

Then, the reject controller 140 handles the forbidden resources based on the reliabilities of the forbidden resources in response to trigger events, such as an expiration of a timer, a power-off of the electronic device 110, a removal of the UICC card 155, and the like. In an example, when the timer 160 expires, the reject controller 140 removes the second list from the memory 170, and keeps the first list in the memory 170.

In another example, the memory 170 is a non-volatile memory. In the example, at a power-off of the electronic device 110, the electronic device 110 performs a power-off procedure. During the power-off procedure, the reject controller 140 removes the second list from the memory 170, and keeps the first list in the memory 170

In another example, when the UICC card is detached from the card interface 150, for example being removed from the card interface 150, the reject controller 140 removes the second list from the memory 170, and keeps the first list in the memory 170.

In another embodiment, the reject controller 140 is configured to store forbidden resources to different memory devices based on respective reliability attribute. For example, the reject controller 140 is configured to store forbidden PLMNs in the UICC card 155 when the reject attribute is reliable, and store forbidden PLMNs in the memory 170 as an extension to the UICC card 155 when the reject attribute is unreliable as shown by 173.

For example, when the electronic device 110 receives a first reject message (e.g., a fake reject message) that is sent by the fraudulent network 102, the electronic device 110 detects that the first reject message is not integrity protected, thus the first reject message is unreliable. The reject controller 140 determines a first forbidden PLMN (e.g., fake forbidden PLMN) for example based on a cause value 11 in the first reject message, and then stores the first forbidden PLMN in the memory 170.

In the example, when the electronic device 110 receives a second reject message (e.g., a genuine reject message) that is sent by a base station in the service provider network 101 that has established secure exchange of messages with the electronic device 110, the electronic device 110 detects that the second reject message is integrity protected, thus the second reject message has the reliable attribute. The reject controller 140 determines a second forbidden PLMN (e.g., genuine forbidden resource) for example based on a cause value 11 in the second reject message, and then stores the second forbidden PLMN in the memory of the UICC card 155.

Then, the reject controller 140 handles the forbidden resources based on the reliabilities of the forbidden resources in response to trigger events.

In an example, the memory 170 is a volatile memory. In the example, the electronic device 110 experiences an unexpected power-off. Due to the power off, the forbidden PLMNs that have unreliable attribute are removed from the electronic device 110, and the forbidden PLMNs that have reliable attribute are still stored in the UICC card 155. In another example, when the UICC card 155 is detached from the card interface 150, for example being removed from the card interface 150, the reject controller 140 removes the forbidden PLMNs from the memory 170.

In a related exemplary device, forbidden PLMNs are stored in a UICC card without identifying the reliability attribute. Further, when the UICC card is full, additional forbidden PLMNs are stored in for example a volatile memory in the related exemplary device. When the related exemplary device experiences an unexpected power off or a UICC card removal, the fake forbidden PLMNs may stay in the UICC card, and the related exemplary device lacks information (e.g., attempt counters are cleared due to power off and/or UICC card removal) to correctly handle the fake forbidden PLMNs.

Figure 2:
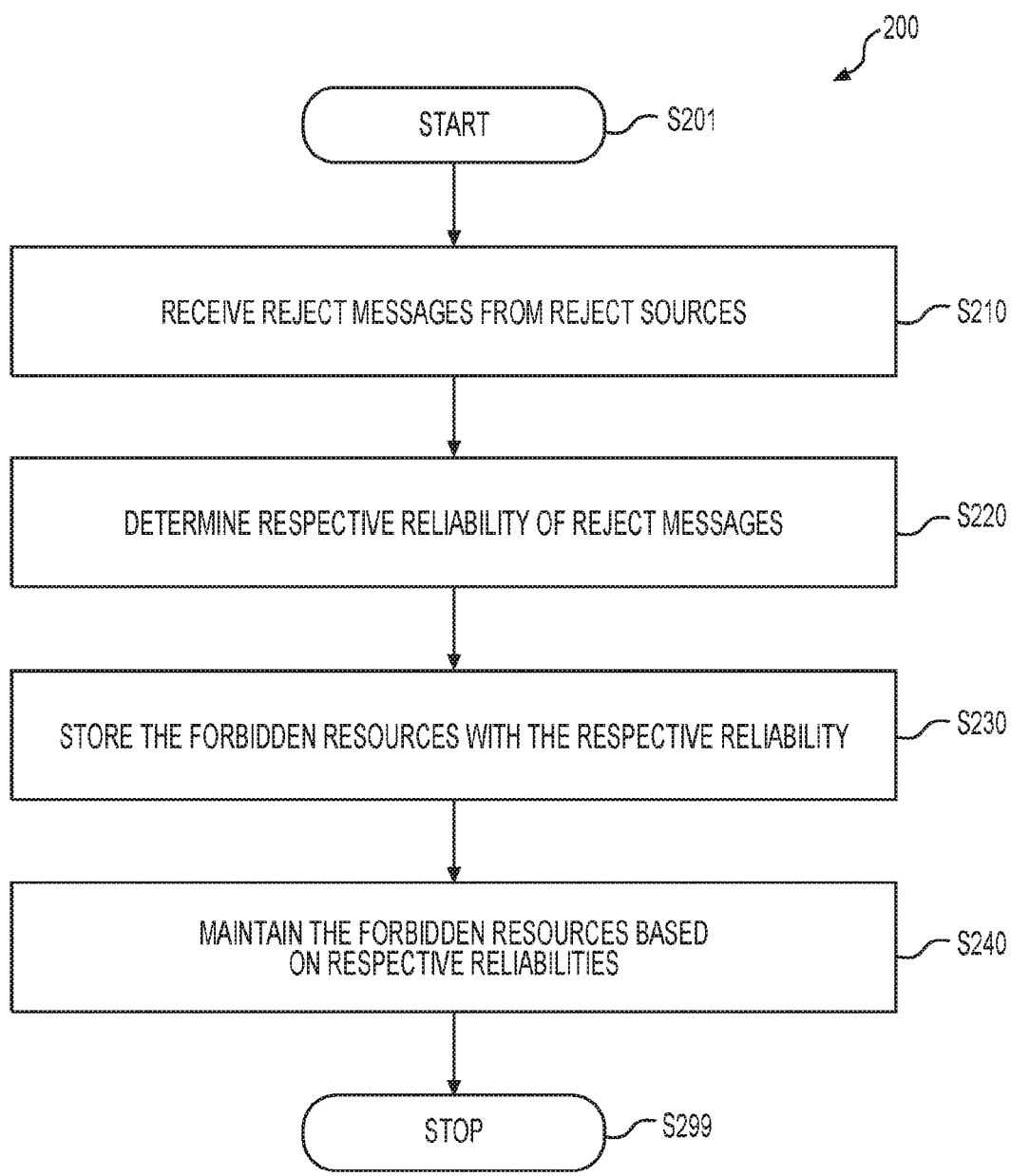
FIG. 2 shows a flow chart outlining a process 200 according to an embodiment of the disclosure.

FIG. 2 shows a flow chart outlining a process 200 according to an embodiment of the disclosure. In an example, the process 200 is executed by the electronic device 110. The process starts at S201 and proceeds to S210.

At S210, reject messages are received from reject sources. In the FIG. 1 example, the transceiver 120 can transmit wireless signals to request resources from the service provider network 101 for wireless communication, and then receive wireless signals that carry one or more reject messages.

At S220, respective reliabilities of the reject messages are determined. In the FIG. 1 example, the reject controller 140 is configured to determine a reliability attribute of a reject message, for example whether the reject message comes from a reliable source. In an example, the reject controller 140 determines whether the reject message is integrity protected. When the reject message is integrity protected, the reject controller 140 can authenticate the reject message, and determines that the reject message comes from a reliable source. Thus, the reliability attribute of the reject message is reliable. When the reject message is not integrity protected, the reject controller 140 determines that the reject message comes from an unreliable source. Thus, the reliability attribute of the reject message is unreliable.

At S230, forbidden resources are stored with reliabilities. For example, in an embodiment, the reject controller 140 is configured to store a forbidden resource with a reliability indicator for the forbidden resource in the memory 170, as shown by 171. The reliability indicator can indicate the reliability attribute for the reject message (and the reject source).

In another embodiment, the reject controller 140 is configured to store forbidden resources to different lists based on respective reliability attributes. For example, the memory 170 stores a first list and a second list as shown by 172. The first list is configured to store forbidden resources of reliable attribute, and the second list is configured to store forbidden resources of unreliable attribute.

In another embodiment, the reject controller 140 is configured to store forbidden resources to different memory devices based on respective reliability attribute. For example, the reject controller 140 is configured to store forbidden PLMNs in the UICC card 155 when the reject attribute is reliable, and store forbidden PLMNs in the memory 170 as an extension to the UICC card 155 when the reject attribute is unreliable as shown by 173.

At S240, forbidden resources are maintained based on the reliabilities. In the FIG. 1 example, the reject controller 140 handles the forbidden resources based on the reliabilities of the forbidden resources in response to trigger events, such as an expiration of the timer 160, a power-off of the electronic device 110, a removal of the UICC card 155, and the like.

In an example, in response to a trigger event, such as an expiration of a timer, a power-off of the electronic device 110, a removal of the UICC card 155, and the like, the reject controller 140 removes forbidden resources with indicators that indicate unreliable attribute from the list of forbidden resources 171, and keeps forbidden resources with reliable attribute in the list of forbidden resources 171.

In another example, in response to a trigger event, such as an expiration of a timer, a power-off of the electronic device 110, a removal of the UICC card 155, and the like, the reject controller 140 removes the second list of 172, and keeps the first list of 172 in the memory 170.

In another example, the memory 170 is a volatile memory. In the example, the electronic device 110 experiences an unexpected power-off. Due to the power off, the forbidden PLMNs 173 that have unreliable attribute are removed from the electronic device 110, and the forbidden PLMNs that have reliable attribute are still stored in the UICC card 155.

Then the process proceeds to S299 and terminates.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for handling reject in wireless communication, comprising:
   receiving, at an electronic device, a reject message indicative of a forbidden resource of a service provider network to use by the electronic device for wireless communication;
   determining a reliability attribute of the forbidden resource indicated by the reject message;
   storing, in a memory of the electronic device, the forbidden resource in association with the determined reliability attribute; and
   maintaining the stored forbidden resource based on the reliability attribute, including
      in response to a predetermined trigger event, removing the stored forbidden resource from the memory of the electronic device when the reliability attribute indicates that the stored forbidden resource is unreliable, and keeping the stored forbidden resource in the memory of the electronic device when the reliability attribute indicates that the stored forbidden resource is reliable.

2. The method of claim 1, wherein the storing the forbidden resource in association with the reliability attribute comprises:
   storing an indicator that indicates the reliability attribute with the forbidden resource.

3. The method of claim 1, wherein the storing the forbidden resource in association with the reliability attribute comprises:
   storing the forbidden resource in a first list of forbidden resources when the reliability attribute indicates that the stored forbidden resource is reliable; and
   storing the forbidden resource in a second list of forbidden resources when the reliability attribute indicates that the stored forbidden resource is unreliable.

4. The method of claim 1, wherein storing the forbidden resource in association with the reliability attribute comprises:
   storing the forbidden resource in a first memory device when the reliability attribute indicates that the stored forbidden resource is reliable; and
   storing the forbidden resource in a second memory device when the reliability attribute indicates that the stored forbidden resource is unreliable.

5. The method of claim 1, wherein the storing the forbidden resource in association with the reliability attribute comprises:
   storing the forbidden resource in a first memory device that is a non-volatile memory device when the reliability attribute indicates that the stored forbidden resource is reliable; and
   storing the forbidden resource in a second memory device that is a volatile memory device when the reliability attribute indicates that the stored forbidden resource is unreliable.

6. The method of claim 1, wherein the forbidden resource includes at least one of a forbidden location area for general packet radio service (GPRS) services, a forbidden location area for non-GPRS service, a forbidden location area for roaming, a forbidden location area for regional provision of service, a forbidden tracking area for roaming, a forbidden tracking area for regional provision of service, and a forbidden public land mobile network (PLMN).

7. The method of claim 1, wherein the determining the reliability attribute of the forbidden resource comprises:
   determining the forbidden resource to be reliable when the reject message indicative of the forbidden resource is integrity protected; and
   determining the forbidden resource to be unreliable when the reject message indicative of the forbidden resource is not integrity protected.

8. The method of claim 1, wherein
the trigger event includes an expiration of a timer, a power-off of the electronic device, or a removal of a subscriber identify module.

9. An apparatus, comprising:
   a transceiver circuit configured to transmit wireless signals to request resources from a service provider network for wireless communication, and receive wireless signals that carry a reject message;
   one or two memory circuits;
   a processing circuit configured to:
      determine a reliability attribute of a forbidden resource indicated by the reject message;
      control the one or two memory circuits to store the forbidden resource in association with the determined reliability attribute; and
      maintain the stored forbidden resource based on the reliability attribute, including
         in response to a predetermined trigger event, removing the stored forbidden resource from the one or two memory circuits when the reliability attribute indicates that the stored forbidden resource is unreliable, and keeping the stored forbidden resource in the one or two memory circuits when the reliability attribute indicates that the stored forbidden resource is reliable.

10. The apparatus of claim 9, wherein the processing circuit is configured to control the one or two memory circuits to store an indicator that indicates the reliability attribute with the forbidden resource.

11. The apparatus of claim 9, wherein the processing circuit is configured to control the one or two memory circuits to:
   store the forbidden resource in a first list when the reliability attribute indicates that the stored forbidden resource is reliable; and
   store the forbidden resource in a second list when the reliability attribute indicates that the stored forbidden resource is unreliable.

12. The apparatus of claim 9, wherein the processing circuit is configured to control the one or two memory circuits to:

control a first memory circuit to store the forbidden resource when the reliability attribute indicates that the stored forbidden resource is reliable; and
control a second memory circuit to store the forbidden resource when the reliability attribute indicates that the stored forbidden resource is unreliable.

13. The apparatus of claim 9, wherein the processing circuit is configured to control the one or two memory circuits to:
control a first memory circuit that is a non-volatile memory to store the forbidden resource when the reliability attribute is indicates that the stored forbidden resource reliable; and
control a second memory circuit that is a volatile memory to store the forbidden resource when the reliability attribute indicates that the stored forbidden resource is unreliable.

14. The apparatus of claim 9, wherein the forbidden resource includes at least one of a forbidden location area for general packet radio service (GPRS) services, a forbidden location area for non-GPRS service, a forbidden location area for roaming, a forbidden location area for regional provision of service, a forbidden tracking area for roaming, a forbidden tracking area for regional provision of service, and a forbidden public land mobile network (PLMN).

15. The apparatus of claim 9, wherein the processing circuit is configured to:
determine the forbidden resource to be reliable when the reject message indicative of the forbidden resource is integrity protected; and
determine the forbidden resource to be unreliable when the reject message indicative of the forbidden resource is not integrity protected.

16. The apparatus of claim 9, wherein
the trigger event includes an expiration of a timer, a power-off of the electronic device, or a removal of a subscriber identify module.

17. A non-transitory computer readable medium storing program instructions for causing a processor to execute operations for handling reject in an electronic device, the operations comprising:
receiving a reject message indicative of a forbidden resource of a service provider network to use by the electronic device for wireless communication;
determining a reliability attribute of the forbidden resource indicated by the reject message;
storing, in a memory of the electronic device, the forbidden resource in association with the determined reliability attribute; and
maintaining the stored forbidden resource based on the reliability attribute, including
in response to a predetermined trigger event, removing the stored forbidden resource from the memory of the electronic device when the reliability attribute indicates that the stored forbidden resource is unreliable, and keeping the stored forbidden resource in the memory of the electronic device when the reliability attribute indicates that the stored forbidden resource is reliable.

18. The non-transitory computer readable medium of claim 17, wherein the operation of storing the forbidden resource in association with the reliability attribute comprises:
storing an indicator that indicates the reliability attribute with the forbidden resource.

19. The non-transitory computer readable medium of claim 17, wherein the operation of storing the forbidden resource in association with the reliability attribute comprises:
storing the forbidden resource in a first list when the reliability attribute indicates that the stored forbidden resource is reliable; and
storing the forbidden resource in a second list when the reliability attribute indicates that the stored forbidden resource is unreliable.

20. The non-transitory computer readable medium of claim 17, wherein the operation of storing the forbidden resource in association with the reliability attribute comprises:
storing the forbidden resource in a first memory device when the reliability attribute indicates that the stored forbidden resource is reliable; and
storing the forbidden resource in a second memory device when the reliability attribute indicates that the stored forbidden resource is unreliable.

* * * * *